(12) United States Patent
Chen et al.

(10) Patent No.: US 11,330,222 B2
(45) Date of Patent: May 10, 2022

(54) DISPLAY SYSTEM AND DISPLAY APPARATUS

(71) Applicant: GIGA-BYTE TECHNOLOGY CO., LTD., New Taipei (TW)

(72) Inventors: Chin-Hui Chen, New Taipei (TW); Erh-Chia Joung, New Taipei (TW); Kuei-Shan Chang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/315,655

(22) Filed: May 10, 2021

(65) Prior Publication Data

US 2022/0030191 A1     Jan. 27, 2022

(30) Foreign Application Priority Data

Jul. 24, 2020   (TW) ................................. 109125017

(51) Int. Cl.
*H04N 7/10*     (2006.01)
*H04N 5/45*     (2011.01)

(52) U.S. Cl.
CPC ............... *H04N 5/45* (2013.01); *H04N 7/104* (2013.01)

(58) Field of Classification Search
CPC .......... H04N 5/45; H04N 7/104; G06F 13/38; G06F 3/14
See application file for complete search history.

(56) References Cited

U.S. PATENT DOCUMENTS 10,713,192 B2 *   7/2020   Paganini ............. H04L 25/0272
10,769,094 B2 *   9/2020   Frederick .............. G06F 13/385
(Continued)

FOREIGN PATENT DOCUMENTS

CN       102810054 A       12/2012
CN       106339037 A        1/2017
(Continued)

OTHER PUBLICATIONS

Office Action issued in Taiwan Patent Application No. 109125017 dated Feb. 26, 2021.
(Continued)

*Primary Examiner* — Paulos M Natnael
(74) *Attorney, Agent, or Firm* — Birch, Stewart, Kolasch & Birch, LLP (57) ABSTRACT

A display apparatus is provided, which includes a USB Type-C connector, display panel, a multiplexing circuit, a switch circuit, and a display controller. The USB Type-C connector is connected to a portable device, wherein a USB signal between the display apparatus and the portable device includes an image-transmission channel and a data-transmission channel. The multiplexing circuit separates the image-transmission channel from the data-transmission channel. The display controller controls a display mode of the display panel. In response to the display panel being in a first display mode, the display controller transmits a control signal to the switch circuit to control the multiplexing circuit to switch to a first operation mode. In response to the multiplexing circuit being in the first operation mode, the portable device acts as a host terminal in the image-transmission channel, and acts as a device terminal in the data-transmission channel.

14 Claims, 4 Drawing Sheets

(56) References Cited

U.S. PATENT DOCUMENTS

| | | | | |
|---|---|---|---|---|
| 10,922,256 B2* | 2/2021 | Zheng | ................ | G06F 13/4282 |
| 2016/0148597 A1* | 5/2016 | Hamid | ................ | G06F 21/31 |
| | | | | 345/173 |
| 2017/0124009 A1 | 5/2017 | Chen | | |
| 2017/0308498 A1 | 10/2017 | Chen | | |
| 2019/0075338 A1* | 3/2019 | Liao | ................ | H04N 21/2368 |
| 2020/0226087 A1 | 7/2020 | Sun | | |
| 2020/0233822 A1* | 7/2020 | Zheng | ................ | G06F 3/1407 |

FOREIGN PATENT DOCUMENTS

| | | | |
|---|---|---|---|
| TW | 201723868 A | 7/2017 |
| TW | 201804737 A | 2/2018 |
| TW | 201820159 A | 6/2018 |

OTHER PUBLICATIONS

Extended European Search Report for European Application No. 21173875.2, dated Nov. 11, 2021.

\* cited by examiner

DISPLAY SYSTEM AND DISPLAY APPARATUS

CROSS REFERENCE TO RELATED APPLICATIONS

This application claims priority of Taiwan Patent Application No. 109125017, filed on Jul. 24, 2020, the entirety of which is incorporated by reference herein.

BACKGROUND OF THE INVENTION

Field of the Invention

The invention relates to display apparatuses, and, in particular, to a display system and a display apparatus.

Description of the Related Art

The display apparatuses that are currently on the market (e.g., TVs or computer monitors) have more and more functions, and can be connected to multiple devices as image sources, such as personal computers and portable devices. In addition, a portable device is equipped with a storage medium. However, due to the limit of a conventional display apparatus, when a personal computer and a portable device as used as image sources at the same time, the personal computer cannot access data in the storage medium of the portable device, so it will reduce the user experience.

BRIEF SUMMARY OF THE INVENTION

A detailed description is given in the following embodiments with reference to the accompanying drawings.

In an exemplary embodiment, a display apparatus is provided. The display apparatus includes: a USB (Universal Serial Bus) Type-C connector, display panel, a multiplexing circuit, a switch circuit, and a display controller. The USB Type-C connector is connected to a portable device, wherein a USB signal between the display apparatus and the portable device includes an image-transmission channel and a data-transmission channel. The multiplexing circuit is configured to separate the image-transmission channel from the data-transmission channel of the USB signal. The switch circuit is configured to control an operation mode of the multiplexing circuit. The display controller is configured to control a display mode of the display panel. In response to the display panel being in a first display mode, the display controller transmits a control signal to the switch circuit to control the multiplexing circuit to switch to a first operation mode. In response to the multiplexing circuit being in the first operation mode, the portable device acts as a host terminal in the image-transmission channel, and acts as a device terminal in the data-transmission channel.

In some embodiments, the display controller receives a first image signal from a host through a first transmission interface of the display apparatus, and receives a second image signal from the portable device through the image-transmission channel. In addition, the first display mode is a picture-in-picture (PIP) mode or a picture-by-picture (PBP) mode.

In some embodiments, the display apparatus further includes a USB hub. The USB hub is configured to connect to at least one peripheral apparatus, and receive a first data signal from the host through a second transmission interface of the display apparatus. In response to the multiplexing circuit being in the first operation mode, the first data signal is transmitted to the portable device sequentially through the USB hub, the switch circuit, and the multiplexing circuit, so that the host recognizes a storage medium of the portable device and accesses data in the storage medium.

In some embodiments, the USB Type-C connector is a USB Type-C down facing port (DFP) extended from the USB hub.

In some embodiments, the display apparatus further includes an input interface, configured to call an on-screen-display (OSD) interface, and the OSD interface is used to select the at least one peripheral apparatus to control a display screen of the first image signal or the second image signal.

In some embodiments, when the first display mode is the PIP mode, the display controller transmits another control signal to the switch circuit, so that a data signal from the at least one peripheral apparatus connected to the USB hub is connected to the host or the portable device corresponding to a main window in the PIP mode.

In another exemplary embodiment, a display system is provided. The display system includes a portable device, a host, and a display apparatus. The display apparatus includes a USB (Universal Serial Bus) Type-C connector, a display panel, a multiplexing circuit, a switch circuit, and a display controller. The USB Type-C connector is connected to the portable device, wherein a USB signal between the display apparatus and the portable device includes an image-transmission channel and a data-transmission channel. The multiplexing circuit is configured to separate the image-transmission channel from the data-transmission channel of the USB signal. The switch circuit is configured to control an operation mode of the multiplexing circuit. The display controller is configured to control a display mode of the display panel. In response to the display panel being in a first display mode, the display controller transmits a control signal to the switch circuit to control the multiplexing circuit to switch to a first operation mode. In response to the multiplexing circuit being in the first operation mode, the portable device acts as a host terminal in the image-transmission channel, and acts as a device terminal in the data-transmission channel.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the disclosure and should not be taken in a limiting sense. The scope of the disclosure is best determined by reference to the appended claims.

It should be understood that the words "comprising", "including" and the like used in this specification are used to indicate the existence of specific technical characteristics, numerical values, method steps, work processes, components and/or components, but not It does not exclude that you can add more technical features, values, method steps, job processing, components, components, or any combination of the above.

The terms such as "first", "second", and "third" are used in the claims to modify the elements in the claims, and are not used to indicate that there is a priority order, prior relationship, or is a component before another component, or the time sequence when performing method steps, only used to distinguish components with the same name.

Figure 1:
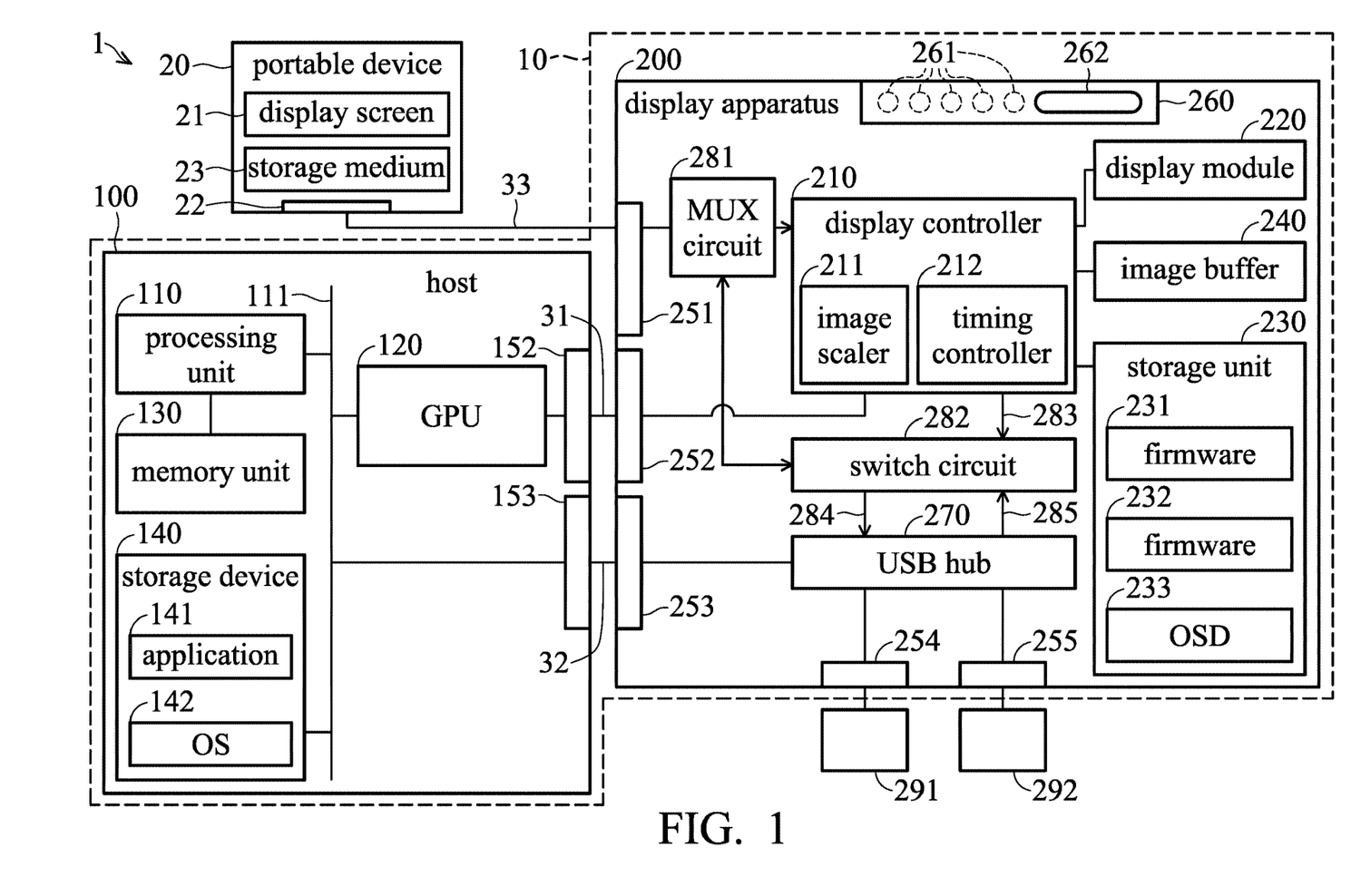
FIG. 1 is a block diagram of a display system in accordance with an embodiment of the invention.

FIG. 1 is a block diagram of a display system in accordance with an embodiment of the invention.

The display system 1 may include a host 100, a display apparatus 200, and a portable device 20. The host 100 and the display apparatus 200 can be collectively regarded as an electronic device 10. For example, the electronic device 10 may be a personal computer, a laptop, a server, or a smart TV that is equipped a display apparatus. In addition, components except for the display apparatus 200 in the electronic device 10 are defined as the host 100. The display apparatus 200 may be a liquid-crystal display, a computer monitor, an electronic billboard, a TV, or any device capable of displaying images. As depicted in FIG. 1, the electronic device 10 may include the host 100 and the display apparatus 200, wherein the host 100 and the portable device 20 have signal connections to the display apparatus 200. The host 100 may include, for example, a processing unit 110, a graphics processing unit (GPU) 120, a memory unit 130, a storage device 140, and transmission interfaces 152 and 153. The processing unit 110, GPU 120, memory unit 130, storage device 140, and transmission interface 153 are coupled to each other via a system bus 111. The processing unit 110 may be a central processing unit (CPU), a general-purpose processor, etc., but the invention is not limited thereto. The graphics processing unit 120, for example, may be a graphics processing unit on a video adapter or integrated into the processing unit 110.

The memory unit 130 may be a random access memory such as a static random access memory (SRAM) or a dynamic random access memory (DRAM), but the invention is not limited thereto. The storage device 140 may be a non-volatile memory such as a hard-disk drive, a solid-state disk (SSD), a flash memory, or a read-only memory (ROM), but the invention is not limited thereto.

For example, the storage device 140 may store one or more applications 141 and an operating system 142 (e.g., Windows, Linux, MacOS, etc.). The processing unit 110 may load the operating system 142 and the one or more the applications 141 to the memory unit 130 for execution. The graphics processing unit 120, for example, may perform graphics processing of the application executed by the processing unit 110 to generate an image signal including one or more images, and transmit the image signal to a transmission interface 252 of the display apparatus 200 via the transmission interface 152, wherein the channel between the transmission interfaces 152 and 252 can be regarded as an image-transmission channel. The transmission interfaces 152 and 252 may include wired transmission interfaces and/or wireless transmission interfaces. The wired transmission interfaces may include: high definition multimedia interface (HDMI), DisplayPort (DP) interface, embedded DisplayPort (eDP) interface, low voltage differential signaling (LVDS), universal serial bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The wireless transmission interfaces may include Bluetooth, WiFi, near-field communication (NFC) interface, etc., but the invention is not limited thereto.

In addition, the processing unit 110 may transmit data to a transmission interface 253 of the display apparatus 200 via the transmission interface 153, wherein the transmission interfaces 153 and 253 may be Universal Serial Bus (USB) interfaces that support the USB 3.1 protocol and/or USB 2.0 protocol. The channel between the transmission interfaces 153 and 253 can be regarded as a data-transmission channel. For example, the host 100 and the display apparatus 200 may transmit data to each other through four SuperSpeed channels and/or two Full Speed channels defined in the USB 3.1 protocol. It should be noted that the transmission interface 253 of the display apparatus 200 may be a UFP (Upstream Facing Port) Type-B port, which means that when the host 100 and the display apparatus 200 are transmitting data, the host 100 acts as the host terminal and the display apparatus 200 acts as the device terminal.

In addition, the portable device 20, for example, may be a smartphone, a tablet PC, or a laptop, and it may include a display screen 21 and a storage medium 23. wherein the display screen 21 is configured to present display images, and the storage medium 23 is configured to store data. In addition, the portable device 20 may be connected to a transmission interface 251 of the display apparatus 200 through its transmission interface 22, wherein the transmission interfaces 22 and 251 may be USB Type-C connectors that support USB 3.1 Gen1 or above protocols. Specifically, the channel between the transmission interfaces 22 and 251 may include an image-transmission channel and a data-transmission channel. For example, the portable device 20 may transmit an image signal to the display apparatus 200 through two SuperSpeed channels of the USB Type-C interface, and transmit data to the display apparatus 200 through two SuperSpeed channels and two HighSpeed channels of the USB Type-C interface. Alternatively, in the DisplayPort Alternate mode, the portable device 20 may transmit the image signal to the display apparatus 200 through four SuperSpeed channels of the USB Type-C interface, and transmit data to the display apparatus 200 through two HighSpeed channels of the USB Type-C interface. It should be noted that the transmission interface 251 may be a UFP (Upstream Facing Port) Type-B port, which means that when the portable device 20 and the display apparatus 200 transmit data to each other, the portable device 20 acts as the host terminal, and the display apparatus 200 acts as the device terminal.

The display apparatus 200, for example, may be a flat-panel display, a TV, a projector, a computer monitor, etc., but the invention is not limited thereto. The display apparatus 200 may include a display controller 210, a display module 220, a storage unit 230, an image buffer 240, transmission interfaces 251 to 255, an input interface 260, and a USB hub 270.

The display controller 210, for example, may be implemented by an application-specific integrated circuit (ASIC), a system-on-chip (SoC), a processor, or a microcontroller, but the invention is not limited thereto.

The display module 220, for example, may be a liquid-crystal display panel, a light-emitting diode (LED) display panel, an organic light-emitting diode (OLED) display panel, a cathode ray tube (CRT) display, an E-Ink display module, an electroluminescent display module, a plasma display module, a projection display module, or a quantum dot display module, but the invention is not limited thereto.

The storage unit 230, for example, may be a non-volatile memory such as a read-only memory (ROM), an erasable programmable read-only memory (EPROM), an electrically erasable programmable read-only memory (EEPROM), etc., but the invention is not limited thereto. The storage unit 230 is configured to store firmware 231 associated with the display apparatus 200. The storage unit 230 may be disposed outside the display controller 210, or alternatively integrated into the display controller 210.

The firmware 231, for example, may include extended display identification data (EDID) and display settings of the display apparatus 200, and one or more on-screen-display (OSD) interfaces 233. The EDID, for example, may include information such as the manufacturer, product name, resolution, frames per second (FPS) of the display apparatus 200. The display settings of the display apparatus 200 may include the brightness, contrast, sharpness, color temperature of the display apparatus 200. The firmware 232 can be used to control the OSD interface 233 of the display apparatus 200.

In an embodiment, the display controller 210 may read the firmware 231, 232 and the OSD interface 233 stored in the storage unit 230 via a bus (e.g., an I2C bus), and configure the corresponding display parameters. In addition, the display controller 210 may transmit the EDID of the display apparatus 200 to the host 100 via the transmission interfaces 252 and 253 (e.g., may be an image-transmission channel or a data-transmission channel), so that the processing unit 110 and the graphics processing unit 120 in the host 100 may configure the resolution and corresponding synchronization signals of the output image signal based on the EDID. The OSD interfaces 233, for example, may include an OSD menu and corresponding options, an information dashboard, a timer, a counter, a crosshair, a specific symbol, a specific color, a specific text, or a combination thereof, but the invention is not limited thereto.

The image buffer 240, for example, may be a volatile memory (e.g., a DRAM) or a non-volatile memory (e.g., a flash memory), that is configured to store output images to be displayed on the display module 220, wherein the host 100 or the display controller 210 may, according to an OSD control signal generated by the host 100, overwrite a specific region of the image signal stored in the image buffer 240 with the one or more OSD interfaces 233 to generate an output image.

The input interface 260 is configured to control the OSD menu of the display apparatus 200. The input interface 260 may be implemented by one or more physical buttons 261 or a five-way joystick 262 to implement instructions such as up, down, left, right, and confirm. The host 100 may transmit data to the display controller 210 through the hub 270 via the transmission interfaces 153 and 253. Similarly, the display controller 210 can also transmit data to the host 100 through the hub 270 via the transmission interfaces 153 and 253.

The USB hub 270 can receive a USB data signal from the host 100 through the transmission interface 253 (e.g., a USB Type-C interface), and the display controller 210 can transmit another USB data signal to the host 100 through the USB hub 270 via the transmission interface 253, wherein the USB data signal may include a USB SuperSpeed data signal, and a USB HighSpeed data signal, wherein the USB SuperSpeed data signal may be a data signal that supports a transmission speed defined by the USB 3.1 Gen 1 or above protocol, and two USB SuperSpeed channels of the USB Type-C interface can be used by the USB SuperSpeed data signal for data transmission. The USB SuperSpeed channels 1 and 2 (i.e., Lane 0) may be pins A2-A3 (TX1+ and TX1−) and B10-B11 (RX1− and RX1+) of the transmission interface 253 (e.g., a USB Type-C interface). The USB SuperSpeed channels 3 and 4 (i.e., Lane 1) may be pins A10-A11 (RX2− and RX2+) and B2-B3 (TX2+ and TX2−) of the transmission interface 253 (e.g., a USB Type-C interface). The USB HighSpeed data signal, for example, may be a data signal that supports a transmission speed defined by the USB 2.0 protocol. For example, the USB HighSpeed data signal may use the differential-signal pair (D+ and D− pins) defined by pins A6-A7 or B6-B7 of the USB 2.0 interface for data transmission. In addition, the display apparatus 200 may further include transmission interfaces 254 and 255 (e.g., USB Type-A interfaces) that are respectively connected to peripheral apparatuses 291 and 292, such as a keyboard, a mouse, or other external USB storage devices.

The multiplexing circuit 281 may separate the image signal and data signal of the USB signal that is received by the portable device 20 from the transmission interface 251, and transmit the image signal and the data signal respectively to the display controller 210 and the switch circuit 282. Depending on the transmission mode of the transmission interface 251, the image signal may use the four USB SuperSpeed channels or two USB SuperSpeed channels of the USB Type-C interface, and the data signal may correspondingly use two USB HighSpeed channels or two USB SuperSpeed channels plus two USB HighSpeed channels.

The switch circuit 282 may control the operation mode of the multiplexing circuit 281 according to the control signal from the display controller 210, such as a first operation mode and a second operation mode, where the details will be described later.

Figure 2A:
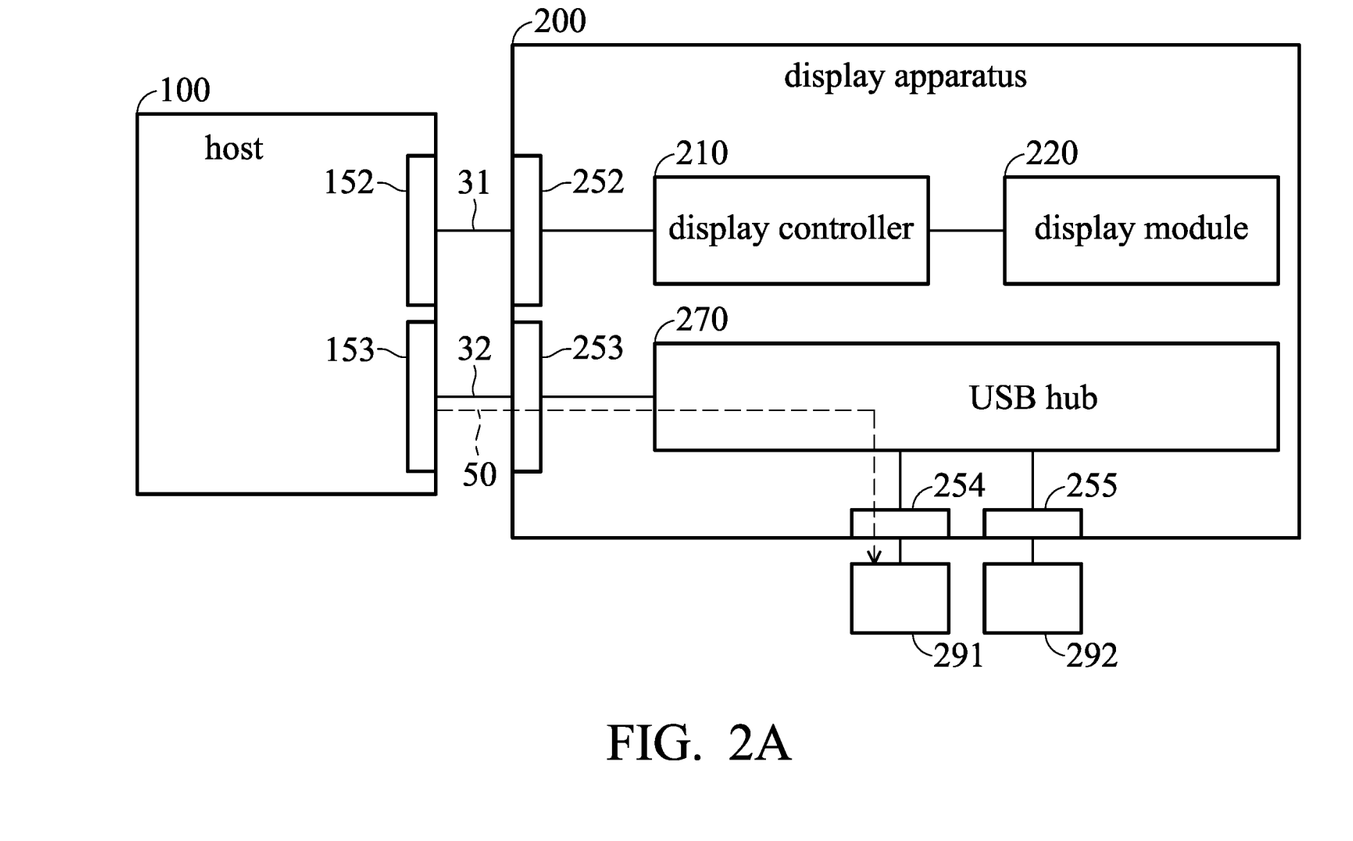
FIGS. 2A-2C are diagrams of paths of the image signal and data signal of the display system in different display modes in accordance with an embodiment of the invention.
Figure 2B:
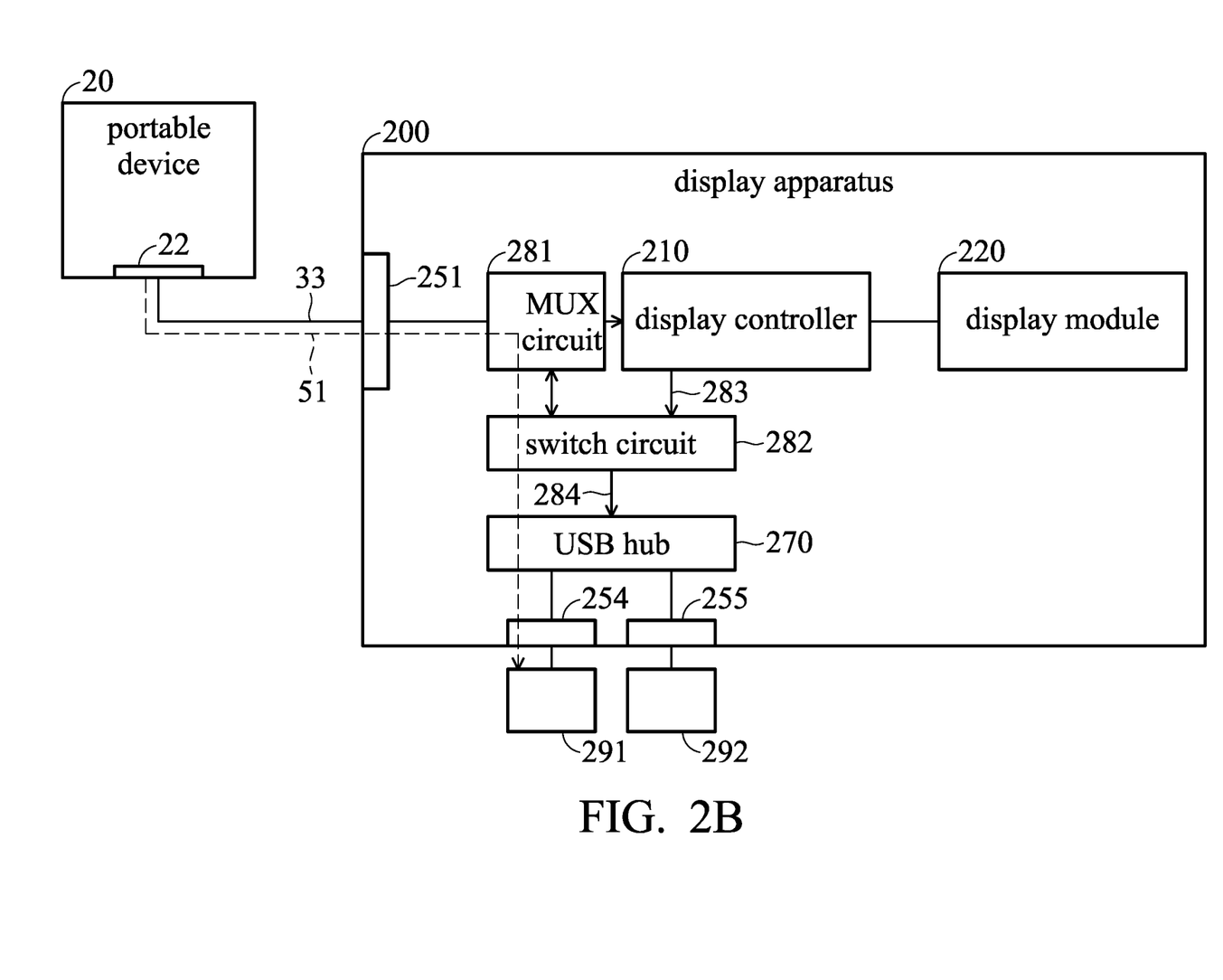
Figure 2C:
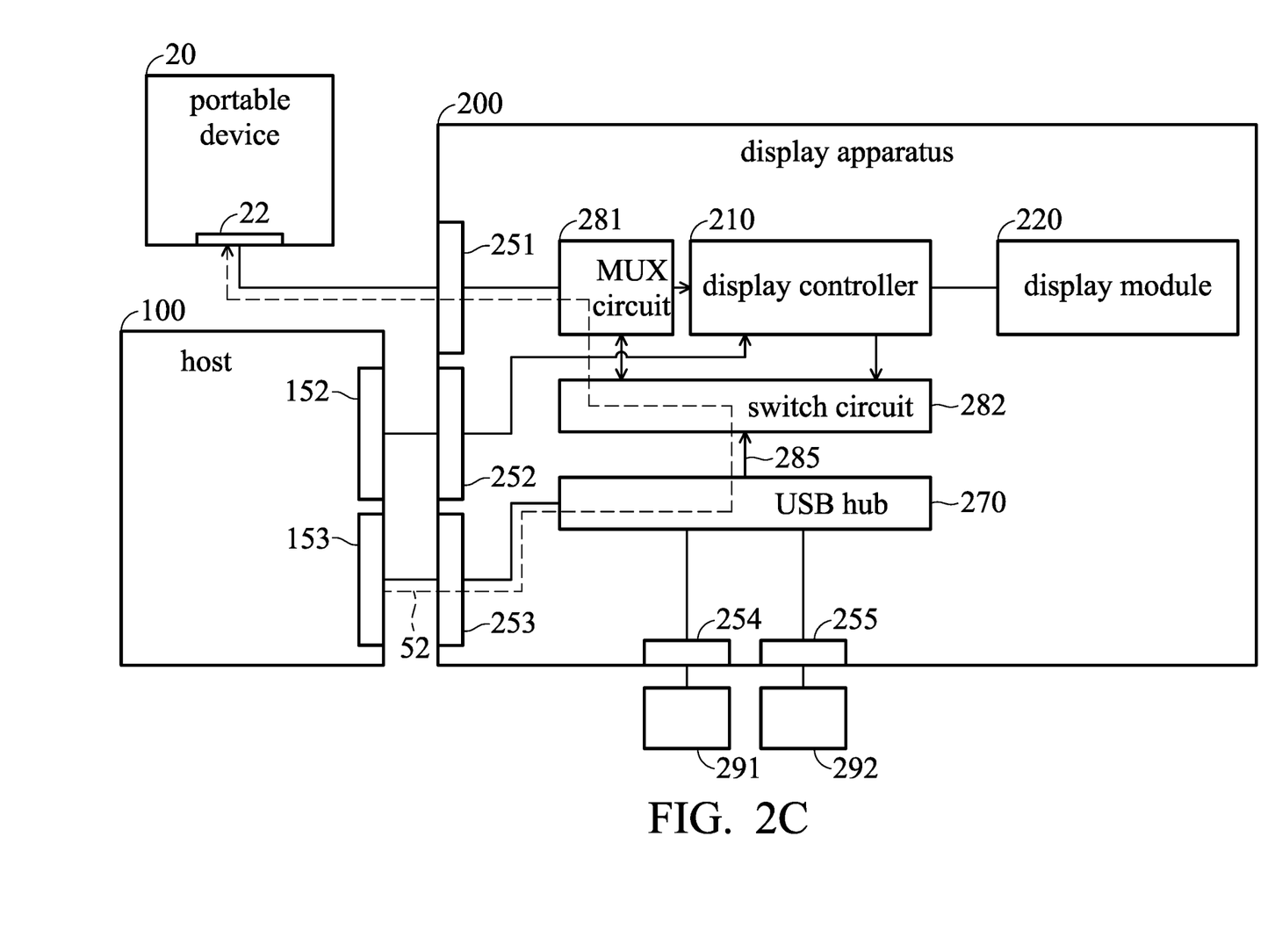

FIGS. 2A-2C are diagrams of paths of the image signal and data signal of the display system in different display modes in accordance with an embodiment of the invention.

In the display mode of FIG. 2A, the host 100 may transmit the image signal to the display controller 210 through the transmission interfaces 152 and 252 (e.g., the image-transmission channel 31), and the display controller 210 may display the image signal on the display module 220. It should be noted that the display controller 210 may ignore the image signal from the portable device 20 at this time, and the switch circuit 282 may cut off the data transmission between the multiplexing circuit 281 and the switch circuit 282. In addition, the host 100 may additionally perform data transmission with the USB hub 270 through the interfaces 153 and 253 (e.g., the data-transmission channel 32), and the peripheral apparatuses 291 and 292 can communicate with the host 100 through the data-transmission channel 32, as shown by the dashed path 50. In this display mode, the host 100 can recognize the peripheral apparatuses 291 and 292 through the data-transmission channel 32, and thus the user may perform operation on the display screen of the host 100 using the peripheral apparatuses 291 and 292, such as inputting keyboard signals, controlling the cursor on the screen, or pressing the mouse button, etc.

In the display mode of FIG. 2B, the portable device 20 may transmit the image signal and data signal to the multiplexing circuit 281 through the transmission interfaces 22 and 251 (e.g., the transmission channel 33), and the multiplexing circuit 281 may transmit the image signal to the display controller 210, and the display controller 210 may display the image signal on the display module 220. It should be noted that the display controller 210 may ignore the image signal from the host 100. In this display mode, the display controller 210 may transmit a control signal 283 (e.g., a GPIO signal at a high logic state) to the switch circuit 282, and the multiplexing circuit 281 may transmit the data signal to the USB hub 270 through the channel 284 of the switch 282 (e.g., regarded as a UFP_0a channel), as shown by the dashed path 51. Accordingly, for the data signal, the portable device 20 may act as the host terminal (i.e., the transmission interface 22 is a down facing port (DFP) at this time), and the peripheral apparatuses 291 and 292 connected to the USB hub 270 may act as device terminals (i.e., the transmission interface 251 is a up facing port (UFP) at this time). In addition, for the image signal, the portable device 20 may act as the host terminal or source terminal, and the display controller 210 may act as the client terminal or device terminal.

Therefore, in the display mode of FIG. 2B, the multiplexing circuit 281 is switched to the second operation mode. In the second operation mode, the portable device 20 may act as the master of the data-transmission channel and image-transmission channel. In addition, the portable device 20 can project its screen onto the display apparatus 200 using the connection of the image-transmission channel and data-transmission channel shown in FIG. 2B, and the user can also use the peripheral apparatuses 291 and 292 to control the display screen of the portable device 20.

In FIG. 2C, the display mode of the display apparatus 200 is set to a picture-in-picture (PIP) mode or a picture-by-picture (PBP) mode, which is regarded as the first display mode. That is, the display controller 210 will simultaneously receive the first image signal from the host 100 and the second image signal from the portable device 20, and perform corresponding image scaling and overlay processing on the first image signal and the second image signal according to the display mode being set, where the aforementioned image processing is well-known to those skill in the art, and thus the details will not be omitted here.

In the display modes in FIG. 2A and FIG. 2B, for the display apparatus 200, the host 100 and the portable device 20 act as host terminals no matter whether in the image-transmission channel or the data-transmission channel. In other words, the two USB Type-C interfaces (i.e., transmission interfaces 251 and 253) of the display apparatus 200 are UFPs. However, in the PIP mode or PBP mode in FIG. 2C, since the host 100 and the portable device 20 respectively output the first image signal and the second image signal to the display apparatus 200, a conventional USB Type-C interface will regard the image signal and data signal as the same role (i.e., both are UFPs or DFPs). That is, the USB Type-C interfaces of the connection between the host 100 and the portable device 20 are UFPs. Accordingly, for the image signal and data signal, the host 100 and the portable device 20 still act as host terminals for a conventional display apparatus. In this situation, although the host 100 and the portable device 20 are connected to the same conventional display apparatus, the host 100 cannot recognize the storage medium 23 of the portable device 20. That is, the host 100 cannot access the data in the storage medium 23 of the portable device 20 at this time. However, the display apparatus 200 of the prevent invention can solve the aforementioned technical problem.

Specifically, in the PIP mode or PBP mode in FIG. 2C, the host 100 still acts as the source terminal or host terminal of the image signal and the data signal. The USB data signal from the host 100 to the transmission interface 253 of the display apparatus 200 is sent to the USB hub 270, and the USB hub 270 expands two USB Type-A ports (i.e., the transmission interfaces 254 and 255). At this time, the display controller 210 may transmit the control signal (i.e., in the low logic state) to the switch circuit 282, and the output signal of the USB hub 270 is transmitted to the transmission interface 251 through the channel 285 (e.g., the DFP_0b channel) and the multiplexing circuit 281. Accordingly, for the data signal, the transmission interface 251 will change from the original USB Type-C UFP to the USB Type-C DFP of the USB hub extension function. Thus, in the PIP mode or PBP mode in FIG. 2C, the multiplexing circuit 281 is switched to the first operation mode. In the first operation mode, the peripheral apparatuses 291 and 292 are connected to the host 100, and the data signal from the host 100 can communicate with the portable device 20 via the USB hub 270, switch circuit 282, and multiplexing circuit 281, as shown by the dashed path 52. The portable device 20 acts as the host terminal in the image-transmission channel, but acts as the device terminal in the data-transmission channel. Accordingly, when the display apparatus is set to the PIP mode or PBP mode, the host 100 can recognize the storage medium 23 of the portable device 20 through the aforementioned data path, and access the data in the storage medium 23.

In another embodiment, although the display apparatus 200 can be set to the PIP mode or PBP mode, because the peripheral apparatuses 291 and 292 are connected to the USB hub 270 of the display apparatus 200, the peripheral apparatuses 291 and 292 can be used to control the display screen of either the host 100 or the portable device 20. In this situation, the user can call the OSD interface 233 through the input interface 262 of the display apparatus 200, and select the transmission interface of the host terminal corresponding to the data signal from the peripheral apparatuses 291 and 292 via the OSD interface 233, such as selecting the transmission interface 251 or 253.

In yet another embodiment, when the display apparatus 200 is set to the PIP mode, the display controller 210 sends a corresponding control signal to the switch circuit 282 so that the data signal from the peripheral apparatuses 291 and 292 to the USB hub 270 is connected to the corresponding device of the main window (i.e., the larger picture). If the display screen of the host 100 is the main window, the USB hub 270 will switch the data signal from the peripheral apparatuses 291 and 292 to the corresponding transmission interface 253. If the display screen of the portable device 20 is the main window, the USB hub 270 switch the data signal from the peripheral apparatuses 291 and 292 to the corresponding transmission interface 251 (e.g., through the switch circuit 282 and multiplexing circuit 281).

While the invention has been described by way of example and in terms of the preferred embodiments, it should be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A display apparatus, comprising:
   a USB (Universal Serial Bus) Type-C connector, connected to a portable device, wherein a USB signal between the display apparatus and the portable device comprises an image-transmission channel and a data-transmission channel;
   a display panel;
   a multiplexing circuit, configured to separate the image-transmission channel from the data-transmission channel of the USB signal;
   a switch circuit, configured to control an operation mode of the multiplexing circuit; and a display controller, configured to control a display mode of the display panel;

wherein in response to the display panel being in a first display mode, the display controller transmits a control signal to the switch circuit to control the multiplexing circuit to switch to a first operation mode, wherein in response to the multiplexing circuit being in the first operation mode, the portable device acts as a host terminal in the image-transmission channel, and acts as a device terminal in the data-transmission channel.

2. The display apparatus as claimed in claim 1, wherein the display controller receives a first image signal from a host through a first transmission interface of the display apparatus, and receives a second image signal from the portable device through the image-transmission channel.

3. The display apparatus as claimed in claim 2, wherein the first display mode is a picture-in-picture (PIP) mode or a picture-by-picture (PBP) mode.

4. The display apparatus as claimed in claim 3, further comprising: a USB hub, configured to connect to at least one peripheral apparatus, and receive a first data signal from the host through a second transmission interface of the display apparatus, wherein in response to the multiplexing circuit being in the first operation mode, the first data signal is transmitted to the portable device sequentially through the USB hub, the switch circuit, and the multiplexing circuit, so that the host recognizes a storage medium of the portable device and accesses data in the storage medium.

5. The display apparatus as claimed in claim 4, wherein, for the data-transmission channel, the USB Type-C connector is a USB Type-C down facing port (DFP) extended from the USB hub.

6. The display apparatus as claimed in claim 4, further comprising an input interface, configured to call an on-screen-display (OSD) interface, and, in the first display mode, the OSD interface is used to select the at least one peripheral apparatus to control a display screen of the first image signal or the second image signal.

7. The display apparatus as claimed in claim 4, wherein when the first display mode is the PIP mode, the display controller transmits another control signal to the switch circuit, so that a data signal from the at least one peripheral apparatus connected to the USB hub is connected to the host or the portable device corresponding to a main window in the PIP mode.

8. A display system, comprising:
a portable device;
a host; and
a display apparatus, comprising:
a USB (Universal Serial Bus) Type-C connector, connected to the apparatus and the portable device comprises an image-transmission channel and a data-transmission channel;
a display panel;
a multiplexing circuit, configured to separate the image-transmission channel from the data-transmission channel of the USB signal;
a switch circuit, configured to control an operation mode of the multiplexing circuit; and
a display controller, configured to control a display mode of the display panel;

wherein in response to the display panel being in a first display mode, the display controller transmits a control signal to the switch circuit to control the multiplexing circuit to switch to a first operation mode, wherein in response to the multiplexing circuit being in the first operation mode, the portable device acts as a host terminal in the image-transmission channel, and acts as a device terminal in the data-transmission channel.

9. The display system as claimed in claim 8, wherein the display controller receives a first image signal from a host through a first transmission interface of the display apparatus, and receives a second image signal from the portable device through the image-transmission channel.

10. The display system as claimed in claim 9, wherein the first display mode is a picture-in-picture (PIP) mode or a picture-by-picture (PBP) mode.

11. The display system as claimed in claim 10, wherein the display apparatus further comprises a USB hub, and the USB hub is configured to connect to at least one peripheral apparatus, and receive a first data signal from the host through a second transmission interface of the display apparatus, wherein in response to the multiplexing circuit being in the first operation mode, the first data signal is transmitted to the portable device sequentially through the USB hub, the switch circuit, and the multiplexing circuit, so that the host recognizes a storage medium of the portable device and accesses data in the storage medium.

12. The display system as claimed in claim 11, wherein, for the data-transmission channel, the USB Type-C connector is a USB Type-C down facing port (DFP) extended from the USB hub.

13. The display system as claimed in claim 11, wherein the display apparatus further comprises an input interface configured to call an on-screen-display (OSD) interface, and, in the first display mode, the OSD interface is used to select the at least one peripheral apparatus to control a display screen of the first image signal or the second image signal.

14. The display system as claimed in claim 11, wherein when the first display mode is the PIP mode, the display controller transmits another control signal to the switch circuit, so that a data signal from the at least one peripheral apparatus connected to the USB hub is connected to the host or the portable device corresponding to a main window in the PIP mode.

* * * * *